United States Patent [19]

Smith et al.

[11] Patent Number: 4,491,447
[45] Date of Patent: * Jan. 1, 1985

[54] ANCHORING RETAINER FOR THREADED FASTENERS

[75] Inventors: Jon D. Smith, Fenton; Glenn T. Parker, Ortonville, both of Mich.

[73] Assignee: Dry Dock Industries, Inc., Fenton, Mich.

[*] Notice: The portion of the term of this patent subsequent to Mar. 13, 1996 has been disclaimed.

[21] Appl. No.: 455,779

[22] Filed: Jan. 5, 1983

Related U.S. Application Data

[60] Continuation-in-part of Ser. No. 150,013, May 15, 1980, Pat. No. 4,397,595, which is a division of Ser. No. 929,689, Jul. 31, 1978, abandoned, which is a continuation-in-part of Ser. No. 803,806, Jun. 6, 1977, Pat. No. 4,143,581.

[51] Int. Cl.$^3$ .............................................. F16B 13/04
[52] U.S. Cl. ..................................... 411/15; 411/34; 411/340
[58] Field of Search ..................... 411/15, 34, 35, 36, 411/37, 38, 75, 76, 77, 78, 79, 80, 337, 340, 341, 342, 343, 344, 345, 346

[56] References Cited

U.S. PATENT DOCUMENTS

| | | | |
|---|---|---|---|
| 964,226 | 7/1910 | Farrand | 411/342 |
| 1,295,734 | 2/1919 | Greubel | 411/38 |
| 1,819,828 | 8/1931 | Tomkinson | 411/346 |
| 2,726,569 | 12/1955 | Penman | 411/60 |
| 2,897,694 | 8/1959 | Carney | 411/341 X |
| 3,213,745 | 10/1965 | Dwyer | 411/15 |
| 3,213,746 | 10/1965 | Dwyer | 411/15 |
| 3,651,734 | 3/1972 | McSherry | 411/15 |
| 4,079,655 | 3/1978 | Roberson | 411/344 |
| 4,143,581 | 3/1979 | Smith et al. | 411/337 |

FOREIGN PATENT DOCUMENTS 1178019 12/1958 France .................................. 411/34

Primary Examiner—Thomas J. Holko
Attorney, Agent, or Firm—Cullen, Sloman, Cantor, Grauer, Scott & Rutherford

[57] ABSTRACT

An anchoring retainer is mounted in a blind hole in a concrete floor or wall. The retainer, adapted to be used with a threaded element, comprises a flexible unitary one-piece body made from a plastic material. The body has an axis, is of generally triangular configuration and has at the apex thereof a sleeve provided with an opening surrounding the axis through which the threaded element extends. The sleeve has a pair of integrally formed outwardly diverging elongated flexible legs. An elongated flexible strut of V-shape is spaced axially from the sleeve and includes a central strut portion located beneath and spaced from the sleeve along with a pair of outwardly diverging strut portions which are integrally connected to the central strut portion and to the flexible legs near the outer ends thereof. In use, the sleeve end of the retainer is inserted into the blind hole, with the free ends of the legs near the open end of the blind hole. The threaded element extends through an opening in the connecting member, which is to be affixed to the supporting structure provided with the blind hole, and then through the opening in the central strut portion until the leading end of the threaded element is threaded into the sleeve of the retainer. Continued rotation of the threaded element moves the threaded element lengthwise in the blind hole until the free ends of the legs are bottomed out or abut the opposing surface of the connecting member. Further rotation of the threaded element causes the legs to further compress and bulge outwardly into tight friction contact with the side wall of the blind hole due to the compression.

4 Claims, 35 Drawing Figures

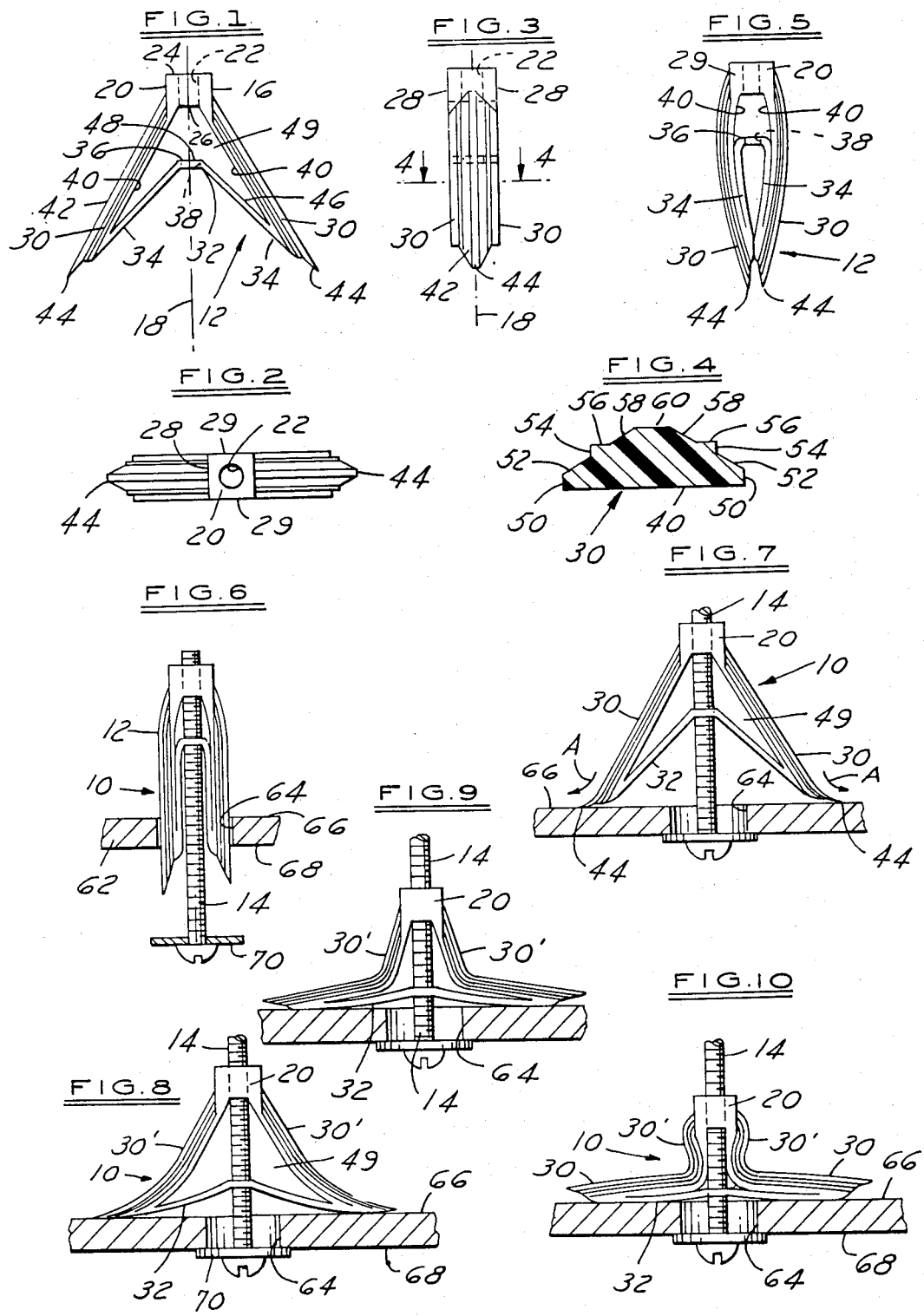

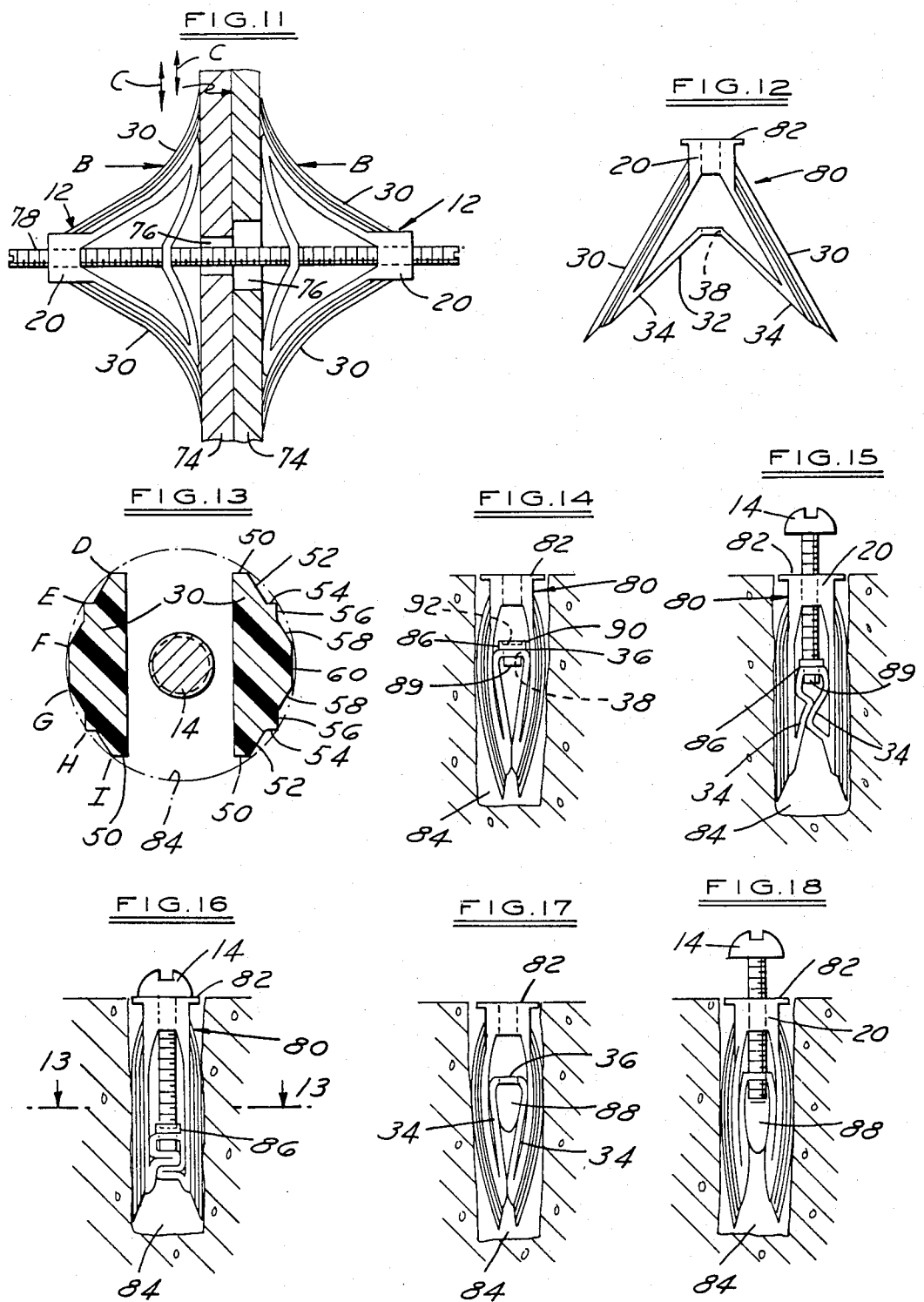

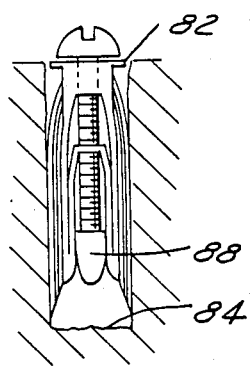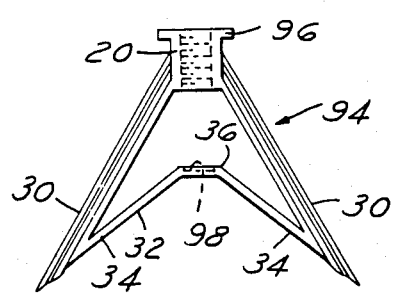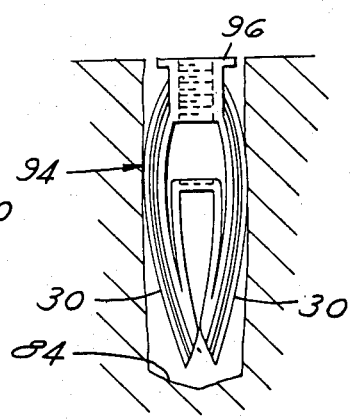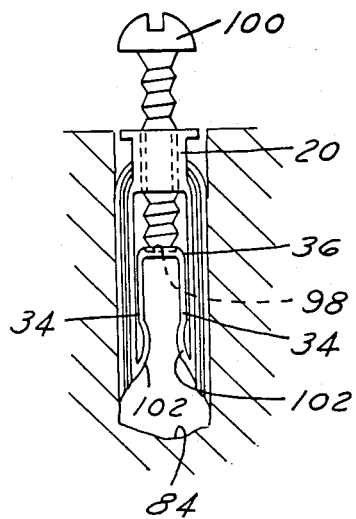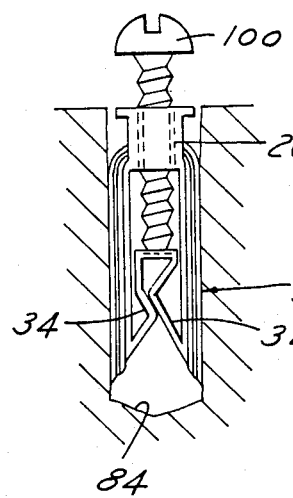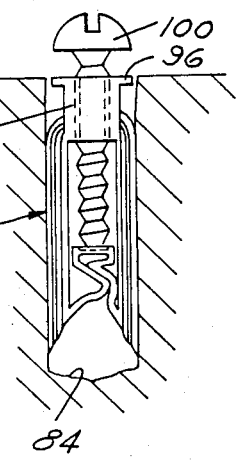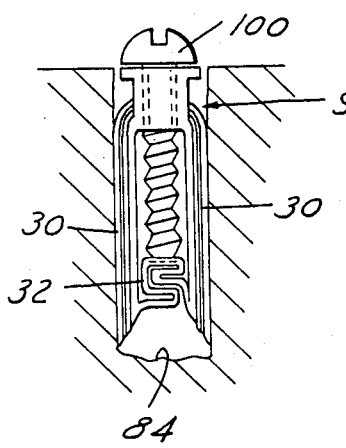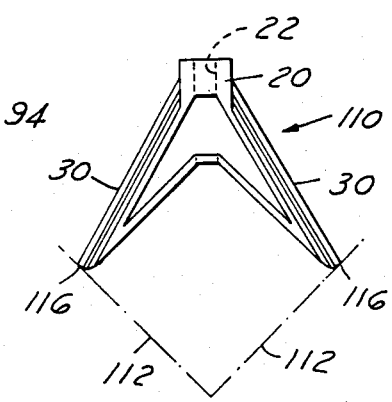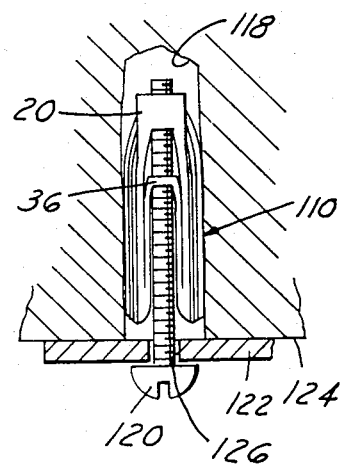

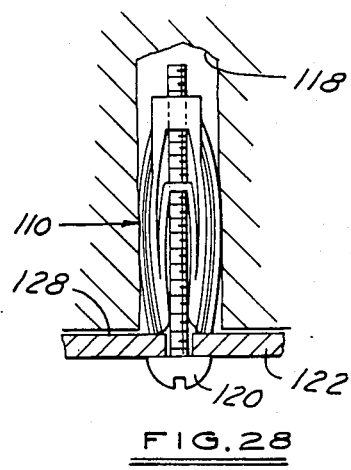
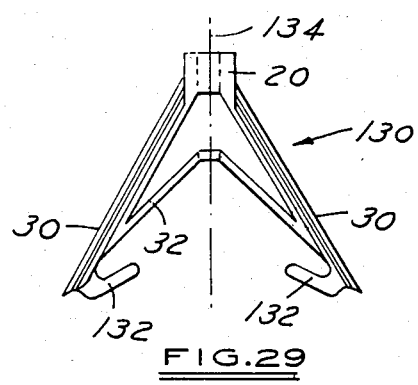
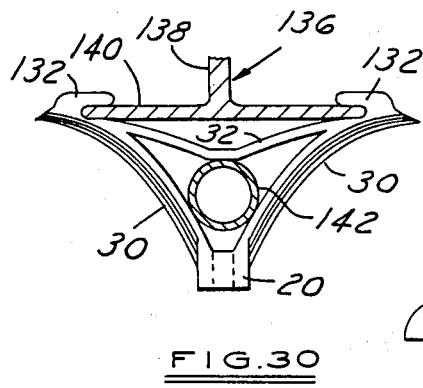
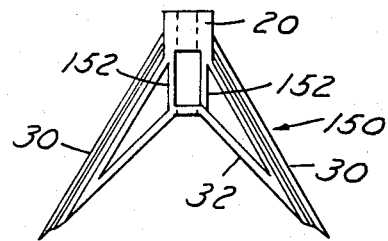
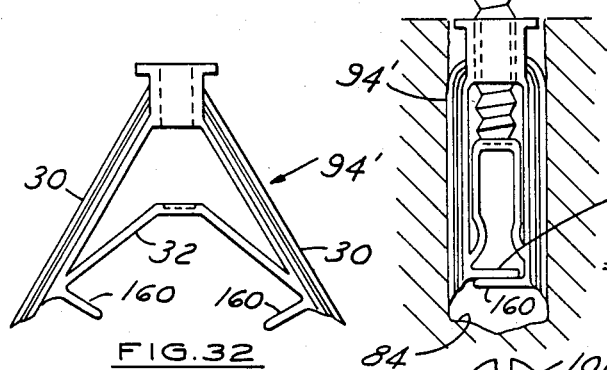
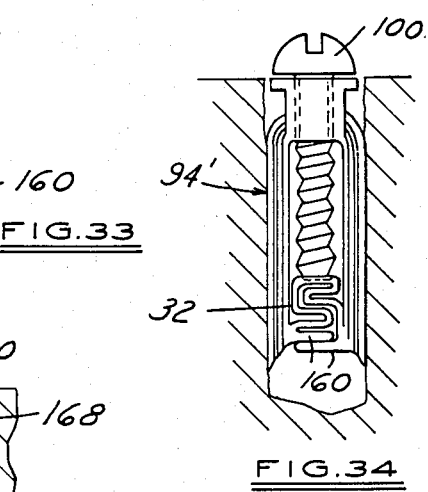
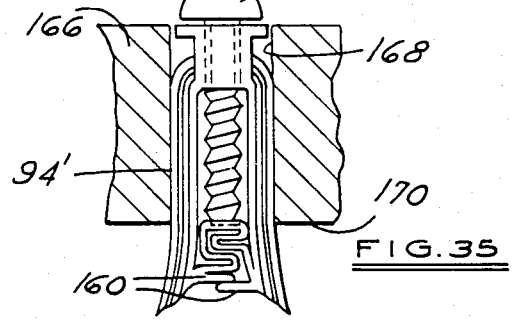

4,491,447

ANCHORING RETAINER FOR THREADED FASTENERS

CROSS-REFERENCE TO RELATED APPLICATIONS

This patent application is a continuation-in-part of our co-pending divisional application Ser. No. 150,013, filed on May 15, 1980 for "Anchoring Retainer For Threaded Fasteners", now U.S. Pat. No. 4,397,595; which was divided from pending prior application Ser. No. 929,689, filed on July 31, 1978 for "Anchoring Retainer for Threaded Fasteners", now abandoned; which was a continuation-in-part patent application of Ser. No. 803,806, filed June 6, 1977, for "Anchoring Retainer For Threaded Fasteners", now U.S. Pat. No. 4,143,581, dated March 13, 1979.

BACKGROUND OF THE INVENTION

1. Field of the Invention

This invention relates to expandable or flexible retainers and fastener assemblies, particularly for use in providing a support on a hollow or solid wall, ceiling or other supporting structure by which various objects may be suspended or attached to the supporting structure. It is common practice to use a "molly bolt". The retainers may also be used in "blind" hole applications.

2. Description of the Prior Art

Retainers or fastener assemblies of the type disclosed herein have been known for a long time in a great variety of embodiments for wall panels, ceilings and other supporting structures, including retainers and fastener assemblies having an expandable portion which by its expansion after mounting, abuts the rear surface of the supporting structure. Blind hole anchors are also known.

While some of the prior art devices have certain features which are common to the present invention, none of them appear to have the design, economic, durability, efficiency and installation advantages of the present invention which will be subsequently described.

SUMMARY OF THE INVENTION

It is a feature of the present invention to provide a fastener assembly comprising a retainer and a threaded fastener carried thereby in which the retainer comprises a unitary one-piece body made from a flexible material and having an A-shape or triangular configuration prior to use and after the retainer body has been inserted through a restrictive hole in the supporting structure. The body is initially collapsed around the threaded fastener to assume a clothes-pin configuration and the collapsed fastener assembly is thereafter inserted through the restrictive hole of the supporting structure. The retainer of the assembly due to the flexibility of the material expands to its initial shape after insertion through the restrictive hole. Upon a force being applied to the threaded fastener in a direction away from the support, the legs of the retainer grip the support. The threading of the threaded fastener into the retainer while at the same time maintaining said force is effective to expand the legs of the retainer to increase the area of the legs in frictional contact with the supporting structure thus increasing the tensile strength of the fastener assembly.

Another feature is to provide a plastic retainer of unitary construction that is internally triangulated under a load to bridge the weight away from the installation hole, while placing its member in tension and compression, not only on flat, but concave, and convex, and most irregular surfaces as well.

Another feature of the present invention is to provide a retainer of the aforementioned type which is made from a plastic material having certain advantages over prior art devices including fabricating the retainer in a unitary body, is light weight, non-corrosive, non-conductive and dampens vibrations when in use.

A further feature of the present invention is to provide a flexible retainer of the aforementioned type which permits its end use as an anchor, clamp, cushion, hanger, leg, puller, or shock absorber.

A still further feature of the present invention is to provide a retainer of the aforementioned type which due to the flexibility thereof, may be contoured to fit varied surfaces which are flat, concave, convex, irregular, compound, circular or to surfaces which form acute or obtuse angles.

Another feature of the present invention is to provide a retainer of the aforementioned type wherein the body has a sleeve at the apex of the triangular configuration which is provided with a centrally located opening for the threaded fastener and with the sleeve being provided with a pair of integrally formed outwardly diverging flexible legs. With such a construction, a flexible control strut is spaced from the sleeve and has the ends thereof integrally connected to the outer ends of the flexible legs to control the surface area of the flexible legs in contact with the support surface to effectively distribute the load. With such a construction, the greater the load applied to the retainer, the more surface areas of the legs are in contact with the support surface to distribute the load. This is accomplished without any increase in the diameter of the restrictive hole in the supporting structure which normally is one half inch diameter or smaller for most household and electrical fastening applications. During the loading of the retainer the flexible control strut is placed in tension and the legs are placed in compression.

Still another feature of the present invention is to provide a retainer of the aforementioned type where the size of same may be varied for use in various strength applications.

A Still further feature of the present invention is to provide a fastener assembly of the aforementioned type which, due to the flexibility of the retainer and to the frictional contact between the legs of the retainer and the supporting structure, can be used with light sheet metal or other thin materials forming the supporting structure without damaging or distorting such structure.

The fastener assembly of the present invention, when installed at one side of a supporting structure, can support swinging loads and withstand shock or lateral impact or forces on the supported load without any damage to the supporting surface. During installation, the collapsed fastener does not clip or enlarge the restrictive hole in the supporting structure. Once installed and in use at maximum load, the threaded fastener is not normally damaged.

Another feature of the present invention is to provide a fastener assembly for use in a blind hole where the retainer is folded around the threaded element, and the assembly is inserted into the blind hole. Rotation of the threaded element collapses, expands or folds the strut portions of the retainer thereby urging the legs of the retainer radially outwardly into tight frictional contact with the wall of the blind hole.

Finally it is a feature of the present invention to provide a resilient retainer and a fastener assembly which are simple in construction; contain relatively fewer parts than prior art devices; are easy to manufacture; are efficient in operation; and are economical to maintain.

BRIEF DESCRIPTION OF THE DRAWINGS

FIG. 1 is a front elevation of the flexible retainer;

FIG. 2 is a top view of the retainer;

FIG. 3 is a side elevation of the retainer;

FIG. 4 is a section view of a leg of the retainer taken on the line 4—4 of FIG. 3 and on an enlarged scale;

FIG. 5 is a front elevation of the retainer in a folded position prior to insertion through a restrictive opening;

FIG. 6 is a front elevation of the fastener assembly, with the flexible retainer in a collapsed or folded position around the threaded fastener, and with the assembly being inserted through the opening in a supporting structure;

FIG. 7 is a front elevation of the fastener assembly mounted on one side of the supporting structure immediately after installation;

FIGS. 8 and 9 are front elevations of the mounted fastener assembly in various stages of loading after the threaded fastener has been rotated to expand the retainer and due to its internal triangulation has placed the strut in tension and compressed the legs of the retainer;

FIG. 10 is a front elevation of a mounted fastener assembly, with the strut in tension and the legs in compression and with the legs and lower sleeve applying compression to the threaded element to assist in maintaining the load applied to the fastener assembly;

FIG. 11 is an elevational view, partly in section, illustrating a fastener assembly utilizing a pair of loaded retainers used for applying compression to a pair of plates while still permitting lateral movement of the plates if required for a specific job application;

FIG. 12 is a front elevation of another embodiment of the flexible retainer primarily suited for use in a blind hole;

FIG. 13 is a horizontal sectional view through a fastener assembly taken on the line 13—13 of FIG. 16 and illustrating the various points of contact between the legs of the retainer and the blind hole and on an enlarged scale;

FIGS. 14, 15 and 16 illustrate the modified retainer of FIG. 12 having a plug inserted in the control strut and located in a blind hole (FIG. 14) and with the threading of the threaded element into the hole resulting in the folding, expanding and collapsing of the strut and the expansion of the legs into frictional contact with the blind hole as shown in FIGS. 15 and 16;

FIGS. 17, 18 and 19 illustrate the same modified retainer of FIG. 12 in a blind hole and which is utilized in conjunction with a wedge which is engaged by the threaded element and is driven downwardly into the blind hole upon the threading of the threaded element into the blind hole thereby applying pressure to the legs resulting in frictional contact of the legs with the wall of the blind hole;

FIG. 20 is a front elevational view of another embodiment of the flexible retainer which is primarily suited for use in a blind hole:

FIGS. 21, 22, 23, 24 and 25 are front elevational views, partly in section, of the modified retainer of FIG. 20 inserted in a blind hole, with the control strut being shown in various collapsed or folded positions upon the threading of the threaded element into the blind hole resulting in the frictional contact of the legs with the wall of the blind hole as shown in FIG. 25.

FIG. 26 is a front elevational view of still another embodiment of the retainer which is primarily suited for use in a blind hole;

FIGS. 27 and 28 illustrate the modified retainer of FIG. 26, with the sleeve end thereof inserted first into the blind hole and with the threaded fastener being rotated to expand the control strut portions and urge the legs of the retainer into frictional contact with the wall of the blind hole;

FIG. 29 illustrates a modified retainer provided with inwardly turned mounting flanges on the legs thereof for attaching the retainer to a frame without utilizing a screw or bolt;

FIG. 30 illustrates a modified retainer of FIG. 29 supporting a pipe or conduit and being mounted on a frame without requiring a screw or bolt;

FIG. 31 is a front elevation of still another modified retainer;

FIG. 32 illustrates a modified blind hole retainer having downwardly and inwardly turned locking tabs on the inner surfaces of the legs;

FIG. 33 illustrates the retainer of FIG. 32 located in a blind hole prior to the complete insertion of the bolt;

FIG. 34 illustrates the retainer of FIG. 32 and FIG. 33 being expanded in the blind hole upon the threading of the bolt; and FIG. 35 illustrates the modified retainer of FIG. 32 firmly anchored in an opening of a dry wall.

DETAILED DESCRIPTION OF A PREFERRED EMBODIMENT

The fastener assembly 10 comprises only two components including a flexible retainer or truss nut 12 of unitary construction and a threaded fastener or element 14. The retainer 12 is formed by a molding or casting operation from a resilient or flexible material such as nylon or plastic material such as polypropylene of the high impact type. The threaded fastener 14 is commercially available and may take different forms such as a threaded bolt as in FIG. 6 or a threaded element secured to a hook as shown in the parent application.

The retainer 12, shown in full size in the drawings, has a one-piece unitary body 16 of generally A-shape or triangular configuration (FIG. 1). The body 16 is of substantially equal width from top to bottom as shown in FIG. 3 except at the tips of the legs. The body 16 is symmetrical about axis 18 and has a sleeve 20 of generally rectangular cross-section at the apex of the triangular configuration as shown in FIGS. 1 and 2 with axis 18 extending through the center of the sleeve 20. A non-threaded opening 22 concentric with axis 18 extends through the sleeve 20 from flat top surface 24 to the bottom flat surface 26. The opening 22 may be threaded rather than having the fastener 14 cut the threads in opening 22.

The sleeve 20 has two pairs of edges 28 and 29. The pair of edges 28 located on opposite sides of the axis 18 is provided with a pair of integrally formed outwardly diverging elongated flexible legs 30. Each of the legs 30 has a width generally equal to the distance between the other pair of opposing edges 29 of the sleeve 20 as shown in FIG. 2. A flexible control strut or spreader 32 is axially spaced below the sleeve 20 and is located entirely between the legs 30. The strut 32 is of V-shape and includes a central strut portion 36 located axially beneath and spaced from the bottom surface 26 of sleeve 20. The distance between the outer ends of the legs 30 is approximately the same as the height of the retainer 10 measured along the axis 18.

The strut 32 includes a pair of outwardly diverging strut portions or extendable side portions 34 located on opposite sides of the central strut portion 36. The strut 32 has a width equal to the width of the legs 30. The strut portions 34 have the outer ends integrally connected to the inner surfaces of the legs 30 near the tips thereof as shown in FIG. 1. The central strut portion 36 is of rectangular cross section and has a centrally located non-threaded aperture 38 surrounding the axis 18. The aperture 38 has a diameter larger than the diameter of opening 22. The strut portions 34 of the control strut 32 diverge downwardly and away from the central strut portion 36 as shown in FIG. 1 prior to use. The strut portions 34 bend about the edges of the central strut portion 36 as shown in FIGS. 5-10 inclusive when the retainer is loaded, with the strut 32 being placed in tension while the legs 30 are placed in compression.

The legs 30 have an inner surface 40 and an outer surface 42 having elongated raised ribs for stiffening purposes as will subsequently be described. The ribs extend from sleeve 20 to the feet or tips 44 at the bottom of the legs 30.

The inner surfaces 40 of the legs 30 and the inner surfaces 46 and 48 provided on the outwardly diverging strut portions 34 and on the central strut portion 36 respectively surround an opening 49 which extends completely through the body 16.

The outer surface 42 of each leg 30 has a series of steps or ribs or surfaces provided thereon designated 50, 52, 54, 56, 58 and 60 as illustrated in FIG. 4. Each leg 30 is symmetrical as shown in FIGS. 2 and 3 and thus the same numerals have been utilized to designate corresponding surfaces or ribs in FIG. 4. Each rib of leg 30 extend generally from the lower portion of the sleeve 20 substantially the entire length of the leg 30 to the area where the strut 32 is connected thereto. Each tip 44 has a thickness and a width less than the corresponding dimensions of the remaining parts of the legs 30. Tips 44 are formed by surfaces 56, 58 and 60 extending beyond the intersection of the strut 32 with legs 30 as shown in FIGS. 1-3 inclusive. The leg tips 44 help to direct the movement of the legs 30 when the fastener assembly 10 is loaded.

After manufacture the retainer 12 has the size and configuration shown in FIGS. 1-3 inclusive and FIG. 5. Thereafter, the threaded element 14 is inserted through the opening 38 in the central strut portion 36 of strut 32. Clearance is provided between the threaded element 14 and the non-threaded opening 38. The leading end of the element 14 threads the non-threaded opening 22 in sleeve 20. As noted previously it may be desirable to form threads in the opening 22 of sleeve 20 at the time the body 16 is manufactured or such threads may be formed during a secondary operation.

The support structure 62 may be a ceiling, wall, panel or the like from which an object is to be attached or suspended. The support structure 62 is provided with a restrictive opening 64 of circular configuration normally of a one half inch diameter or less. The structure 62 has a support surface 66 normally hidden from view and a front surface 68. The support surface 66 may be flat as illustrated or the surface may be concave, convex, irregular, compound or circular. Also the fastener assembly 10 may be used with a pair of intersecting surfaces having an acute angle or an obtuse angle there between.

In installing the fastener assembly 10, the flexible legs 30 are collapsed or folded to the clothes-pin configuration of FIG. 6 and thereafter the collapsed assembly 10 is inserted through the opening 64 in the support structure 62. Once the collapsed retainer 12 on assembly 10 emerges from hole 64, it expands, with the retainer 12 assuming the position shown in FIG. 7. There the leg tips 44 just contact the support surface 66. The tips 44 direct the movement of legs 30.

Thereafter a force is applied to the threaded element 14 to increase the frictional contact between the tips 44 of the legs 30 and the supporting surface 66 while at the same time the element 14 is rotated in a direction to thread same into the sleeve 20. As a result thereof the strut 32 is placed in tension and moves away from sleeve 20 as shown in FIG. 8 and the legs are placed in compression. Thus more surface area of the end portions of legs 30 contact support surface 66 thereby permitting the carrying of a larger load. The pressure applied to screw or bolt 14 expands the legs 30, while the web or strut 32 limits the spread of the legs 30 and thus causes the legs 30 to collapse inward because of the triangular design of the retainer 10.

A pair of arrows A are shown in FIG. 7 which indicates the direction of the leg movement when a load is applied to the bolt or threaded fastener 14. The application of the load as shown in FIG. 8 is effective to place the center web or strut 32 in tension and the legs 30 in compression. As the bolt 14 is further loaded, the upper leg portions 30' of the legs 30 collapse (FIG. 9) as a result of the center web 32 being in tension. As the load on fastener or bolt 14 is futher increased, the upper leg portions 30' and lower head portion 20 along side 28 collapse further as illustrated in FIG. 10. At such time the inner surfaces 40 of the outer legs 30 contact bolt or fastener 14 and apply compression thereto to increase the holding action. As noted in FIG. 10 the bottom surface of the strut 32 provides additional or increased area (over the area of FIG. 9) which contacts the support surface 66 and assists in distributing the load applied to the fastener assembly 10 over a larger area of the support surface 66. It should also be noted that the control strut 32 is FIGS. 7-10 inclusive directs or transfers the load carried by the fastener assembly 10 to the legs 30 which contact the support surface 66 a distance away from and thereby bridging the hole 64. The threaded fastener 14 is provided with a washer 70 adjacent the head end thereof.

It should be noted that in FIGS. 7-10 inclusive the web or strut 32 spans the insertion hole 64 and keeps the applied load at the tips of the legs 30. In use when the strut or web 32 should fail at maximum load, the legs 30 and sleeve 20 in compression will still support the applied load. Thus the retainer has a built in safety feature such that when the strut fails the legs and sleeve in compression will catch or hold the load.

FIG. 11 illustrates another application of the retainer or truss nut 12. In such an application a pair of retainers 12 are located on opposite sides of a pair of vertically mounted plates 74 having openings 76 therein. The plates 74 are in abutting or sliding relation for adjustment purposes. The openings 22 in the sleeve 20 of the retainers 12 are aligned horizontally and a threaded fastener 78 is inserted first through one retainer 12, opening 76 provided in plates 74 and then through the sleeve 20 of the other retainer 12. Rotation of the threaded fastener 78 from either end is effective to compress the legs 30 as indicated by the arrows B while at the same time permitting lateral or vertical movement in the direction indicated by arrows C. Also the plates can be held firm without screws or adhesives.

Modified retainers for blind hole applications as well as the location of the modified retainers in blind holes are illustrated in FIGS. 12-28 inclusive. The same numerals used to identify the component parts of retainer 12 will be used to designate corresponding parts in the modified retainers.

Retainer or truss nut 80 (FIG. 12) is generally identical to the retainer 12 of FIG. 1 with the exception that the upper end of the sleeve 20 is provided with a radially extending flange 82 which is designed to close the upper end of a blind hole 84 as shown in FIGS. 14-19 inclusive.

The retainer 80 may be utilized with a plug 86 carried by the central strut portion 36 of strut 32 as shown in FIGS. 14-16 inclusive or may be utilized with a wedge 88 located the sides or elongated strut portions 34 of the control strut 32 as illustrated in FIGS. 17-19 inclusive.

The plug 86 has a cylindrical stem 89 which fits into the opening 38 provided in the central strut portion 36 of the strut 32. The plug 86 further includes an annular flange portion 90 having an upwardly opening recess 92 for piloting the leading end of the fastener 14. The flange portion 90 of plug 86 abuts the central strut portion 36 as shown in FIG. 14.

After the insertion of the plug 86 into the opening 38 of strut 32, the retainer 80 is folded into the form of a clothespin; is inserted in a folded condition into the blind hole 84; and assumes the position shown in FIG. 14. Thereafter, the fastener 14 is threaded into the sleeve 20 and the leading end thereof is brought into engagement with the recess 92 of plug 86. Rotation of the threaded fastener 14 into the blind hole 84 is initially effective as shown in FIG. 15 to urge the side portion of opposing surface 34 of the strut 32 towards one another into abutting engagement. Further rotation of the threaded fastener 14 into the blind hole 84 moving the strut 32 towards the bottom of the hole 84 and moving opposite surfaces on each strut portion 34 together into abutting engagement, with continued rotation of the threaded element or fastener 14 into the blind hole 84 locking the strut portions 34 together as shown in FIG. 16. The procedure just described is effective to bend, fold and compress the component parts of the strut 32 in the configuration or manner illustrated in FIG. 16. As a result of the folding and compressing of the strut 32, a lateral or outwardly extending force is created which urges and forces the legs 30 of the retainer 80 into tight fitting frictional engagement with the side wall of the blind hole 84. As illustrated in FIG. 13, each leg 30 grips or bites into the wall of the blind hole 84 at the longitudinal edges D, E, F, G, H and I defined by the intersecting surfaces 50, 52; 54, 56; and 58, 60.

In FIGS. 17-19 inclusive the wedge 88 has a thickness generally equal to the width of the strut 32 and the legs 30. Initially the retainer 80 is folded and the wedge 88 is placed beneath the control strut 32 in engagement with the central strut portion 36 and the sides 34. Thereafter the modified retainer 80 is inserted into the blind hole 84, with the flange 82 being generally at surface level as illustrated in FIG. 17. The fastener 14 is thereafter threaded into the sleeve 20 and the leading end thereof abuts the top surface on the wedge 88 as shown in FIG. 18. Continued rotation of the threaded fastener 14 into the blind hole 84 is effective to move the wedge 88 vertically downwardly towards the bottom of the blind hole 84. As a result thereof the sides 34 of strut 32 are moved radially apart which is effective to forcibly move or urge the legs 30 of the modified retainer 80 radially outwardly into tight frictional engagement with the side wall of the blind hole as shown in FIG. 19 and as generally represented by FIG. 13.

Another modified retainer is illustrated in FIG. 20 and is designated by the numeral 94. It is identical to retainer 12 with the exception that it is provided with a flange 96 on the upper end of the sleeve 20 and by the provision of a recess 98 in the central strut portion 36 of strut 32. In other words, no through hole 38 is provided in the central strut portion as in retainer 12.

In operation, the modified retainer 94 is folded along its central axis into a clothespin configuration and is thereafter inserted into the blind hole 84 as shown in FIG. 21. Thereafter a bolt 100 is threaded into the sleeve 20 of the fastener 94 and the leading end thereof is piloted in the recess 98 provided in the central strut portion 36. Rotation of the bolt 100 into the blind opening 84 initially bows or bends the lower portions 102 of the sides 34 of strut 32 inwardly as noted in FIG. 22. Continued rotation of the bolt 100 urges the component parts of the strut portions 32 together into abutting relationship illustrated in FIG. 23. Further rotation of the bolt 100 into the blind hole 84 is effective to bend, fold and to compress the strut 32 as illustrated in FIG. 24. Finally after additional rotation the head end of the bolt 100 bottoms against the flange 96 at the time when the strut 32 has been bent, folded and compressed thus creating a force which urges the legs 30 of the retainer 94 into tight fitting frictional engagement with the side wall of the blind hole 84. When the bolt 100 is rotated into the blind hole 84, it moves the strut 32 towards the bottom of the hole 84 (FIGS. 22-25 inclusive) and moves the opposite surfaces on each strut portion 34 together (FIG. 23) into abutting engagement, with continued rotation of threaded element, fastener or bolt 100 into the blind hole folding and locking the strut portions together as shown in FIG. 25.

It will be noted in the blind hole applications illustrated in FIGS. 14-19 inclusive and in FIGS. 21-25 inclusive that the legs 30 of each retainer are inserted first into the blind hole 84, with the sleeve end of the retainer being located adjacent the surface at the open end of the hole 84. With the blind hole application illustrated in FIGS. 27 and 28, the sleeve end of the retainer 110 is inserted first into the blind hole.

Retainer 110 illustrated in FIG. 26 is identical to the retainer 12 of FIG. 1 with the exception that the tips 44 of the legs 30 in FIG. 1 have been cut off and severed along perpendicular lines 112 to provide chamfers 116 on the ends of the legs. The retainer 110 is folded about its axis and is thereafter inserted into the blind hole 118. A fastener 120 is provided for connecting any part, member or element 122 to the wall surface 124 having the blind hole 118 therein. After the retainer 110 is inserted in hole 118, the member 122 is brought into engagement with the outer surface 124 surrounding the blind hole 118. The fastener 120 extends first through the opening 126 provided in element 122 and thereafter through the central strut portion 36 into threaded engagement with the opening 22 in sleeve 20. The fastener 120 is rotated into the blind hole 118 with the result that the legs 30 because of the chamfers 116 are bottomed out on the back surface 128 of the part or element 122 being mounted. Once the legs 30 bottom out on the element 122 the legs 30 start to bulge outwardly at their middle due to the compression thereof. Once the legs 30 have been compressed to their fullest extent, the retainer 110 thereafter twists a certain amount which allows further compression of the retainer 110 and aids to lock the retainer 110 in the hole 118. In use, the sleeve end of the retainer 110 is inserted into the blind hole 118, with the free ends of the legs 30 near the open end of the blind hole 118. The threaded element 120 extends through the opening 126 in the connecting member 122, which is to be affixed to the supporting structure provided with the blind hole 118, and then through the opening in the central strut portion 36 until the leading end of the threaded element 120 is threaded into the sleeve 20 of the retainer 110. Continued rotation of the threaded element 120 moves the threaded element 120 lengthwise in the blind hole 118 towards the open end of the hole 118 until the free ends of the legs are bottomed out or abut the opposing surface of the connecting member 122 as shown in FIG. 28. Further rotation of the threaded element 120 causes the legs 30 to further compress and bulge outwardly into tight friction contact with the side wall of the blind hole 118 due to the compression.

FIG. 29 illustrates a modified truss nut or retainer 130 having a sleeve 20, legs 30 and a solid control strut 32 which is connected to the outer ends of the legs 30 like the other retainers discussed previously. In addition, the inner surface of each leg 30 below strut 32 is provided with a curl or inturned flange 132 which in its free state extends generally towards the center axis 134. The modified truss nut or retainer 130 utilizes the curls or flanges 132 for attaching the retainer to the supporting surface for the purpose of attaching a part, element, conduit or the like to a framing system without using a screw or bolt.

FIG. 30 illustrates a framing system 136 having a vertical flange 138 and a horizontal flange 140. A series of modified truss nuts or retainers 130 are suspended from the flange 140 via the retaining tabs or flanges 132 as shown. The strut 32 is placed in tension while the legs 30 are in compression thereby holding the flanges 132 on the framing system 136.

The series of modified retainers 130 mounted on the framing system 136 support, as an example, a conduit, wiring, plumbing or other element designated by the numeral 142. The sleeve 20 may be provided with a threaded opening as shown so that an element may be attached to the sleeve ends of the retainers 130.

The modified retainer 150 of FIG. 31 is similar to retainer 12 illustrated in FIG. 1 and in addition is provided with a pair of generally parallel vertical webs 152 which extend from the head or sleeve 20 to the control web or stut 32. Such webs 152 are used in order to strengthen the retainer 150 for FIG. 32 illustrates a modified blind hole retainer 94' which is similar to the retainer 94 of FIG. 20 with the exception that the inner surfaces of the leg 30 have been provided with downwardly and inturnly turned locking tabs 160. The tabs 160 will help to prevent the installer from pushing the web or strut 32 out of the bottom of the blind hole if too long a screw or bolt 100 were used. Also the tabs 160 will transfer the pressure of the strut or web 32 to the outer legs 30 thus locking the retainer 94' tighter in the blind hole, specifically at the bottom.

FIG. 33 is similar in certain respects to FIG. 22 with the exception that the tabs 160 are shown parallel and in engagement after the bolt 100 has been initially threaded into the blind opening 84 and the strut 32 has started to bend or bow. As the threaded fastener 100 is further rotated into the blind opening 84, the component parts of the control strut 32 are brought into abutting engagement and are bent, folded and collapsed (similar to FIGS. 23 and 24) until finally a generally solid mass (or form of C-lock) is formed as illustrated in FIG. 34.

The tabs 160 will also allow the use of this design in a hole where the walls of the installation hole are not the full length of the legs, as an example, in a dry wall 166 as illustrated in FIG. 35. This will be achieved because the tabs 160 when pushed through hole 168 will create a bulge on the back side 170 of the wall 166 as noted in FIG. 35. With such a construction the web 32 pushes on the legs 30 and tabs 160 to create the aforesaid bulge (or form of C-lock). The tabs 160 also stop the web 32 from being pushed completely through the opening or hole 168.

What is claimed is:

1. A fastener assembly adapted to attach a connecting member provided with an opening to a supporting structure comprising in combination a retainer for mounting in a blind hole of the supporting structure and a threaded element which extends into and is threadedly carried by said retainer for holding said retainer in the blind hole and for attaching the connecting member, said retainer being foldable prior to insertion into the blind hole and comprising a flexible unitary one-piece body made from a plastic material, said body being symmetrical and having an axis which is adapted to extend through the hole in the supporting structure when the retainer is folded and inserted therein, said body having a top, a bottom and a pair of sides, said body between said sides being of substantially uniform width between said top and said bottom, said body prior to its insertion into said hole being of generally triangular configuration when viewed from either one of the sides thereof, said body having a sleeve provided with a sleeve opening surrounding the axis, and sleeve being of rectangular cross section and having a first pair of parallel edge surfaces forming part of the parallel sides of said body, and a second pair of parallel edge surfaces perpendicular to said first pair of parallel edge surfaces and located on opposite sides of said axis, said second pair of edge surfaces being provided with a pair of integrally formed elongated flexible legs, each of said legs having a width generally equal to the distance between the other pair of opposing edges of said sleeve, said legs having said surfaces forming part of the parallel sides of said body, an elongated flexible strut having side surfaces forming part of the parallel sides of said body, said strut being spaced axially from said sleeve and located entirely between said legs, said strut prior to folding being of V-shape and including a central strut portion spaced for the sleeve and a pair of flexible connecting strut portions, a centrally located axially extending opening provided in said central strut portion, each of said connecting strut portions being integrally connected to the central strut portion and to one of the flexible legs near the end thereof, the legs and strut portions of said retainer being moved together to permit said retainer to be inserted into the blind hole, with said sleeve end of the retainer being inserted first into the blind hole and being spaced from the bottom of the blind hole, with said ends of the flexible legs being near the open end of the blind hole, said threaded element extending through the opening in the connecting member and through the opening in the central strut portion and thereafter being threadedly connected to said sleeve whereby rotation of said threaded element into the blind hole being effective to axially move said retainer relative to the open end of the blind hole until the ends of said legs are forceably urged against the opposite surface of the connecting member being mounted on the supporting structure, with continued rotation of said threaded element into the blind hole placing said resilient legs in compression causing a bulge in said legs which assists in moving the outer surfaces of the legs into tight frictional contact with the wall of the blind hole along the height of said legs.

2. The fastener assembly defined in claim 1, with the outer surfaces on said legs having elongated ribs which are adapted to provide points of contact with the bore of the blind hole.

3. The fastener assembly defined in claim 1 wherein each leg has six elongated ribs, thus together providing for twelve points of contact in the blind hole.

4. The fastener assembly defined in claim 1 wherein the free ends of said legs are located within said blind hole, with the initial rotation of said threaded element into the blind hole being effective to axially move said retainer towards the open end of the blind hole to forceably urge the free ends of the legs against the opposing surface of the connecting member.

* * * * *